Patented Jan. 27, 1931

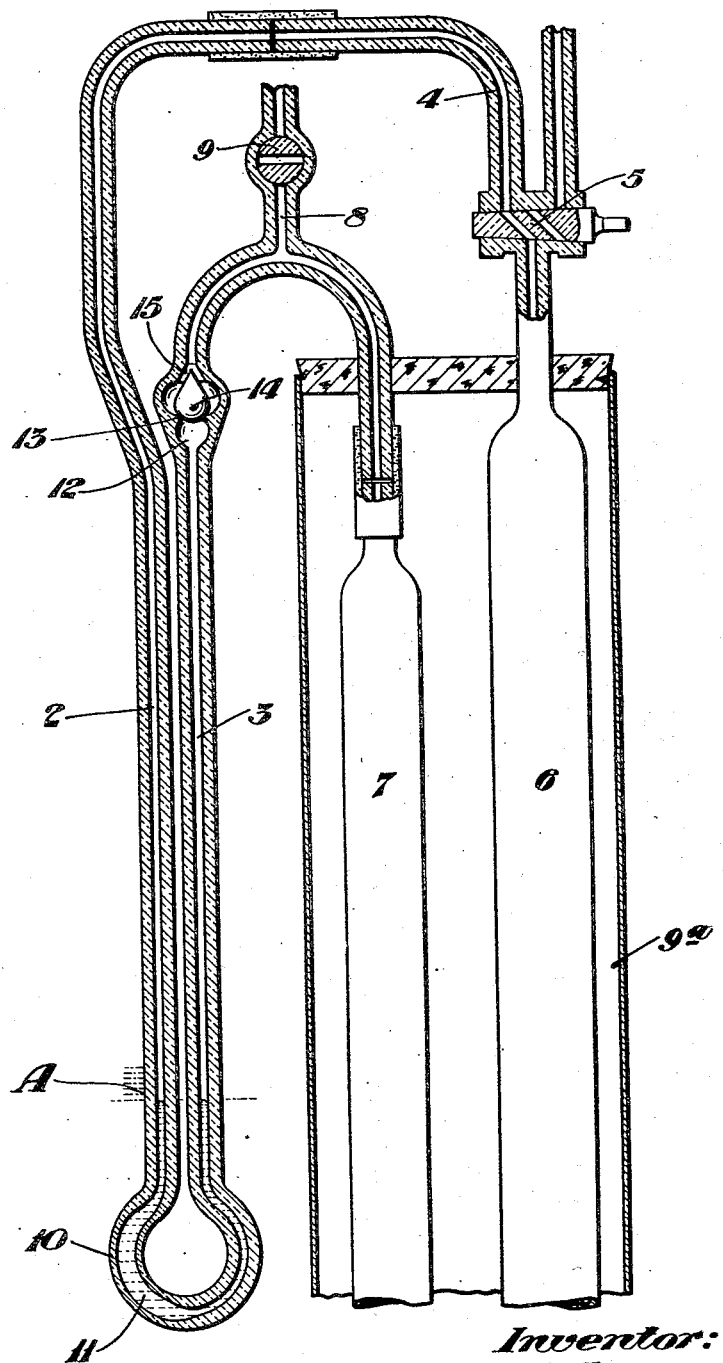

1,790,044

UNITED STATES PATENT OFFICE

CHARLES B. FRANCIS, OF PITTSBURGH, PENNSYLVANIA

MANOMETER

Application filed February 19, 1927. Serial No. 169,634.

This invention relates to manometers and, while not limited thereto, relates more particularly to manometers for measuring or adjusting the pressure of confined gases, as in gas analysis apparatus.

Heretofore manometers generally consisted essentially of a single tube bent U-shaped. If this tube was of capillary size, as is frequently necessary or desirable, the liquid columns were likely to become parted, in which case it was very difficult to join the different parts of the column without disconnecting it from the apparatus to which it was connected. In order to overcome this defect some manometers have been built with one arm of capillary size and the other of larger diameter, so that the column of indicating liquid could be forced into this larger diameter tube when the column became separated, and thus caused to again unite. This last described form of manometer was objectionable since it left only one arm on which readings of pressure could be taken, whereas the actual pressure of a pressure medium, above the standard pressure, is proportionate to the difference in the level of the indicating liquid in the two arms.

In either of the above cases, and in all previous forms of manometers of this type, excessive pressure or suction in one of the arms of the manometer would force the indicating liquid out of the instrument, and would thus allow the gas or other pressure medium to escape or become contaminated with other mediums.

The present invention overcomes all of the above defects. Means are provided for reuniting the parted columns of indicating liquid and means are provided for automatically stopping the flow of both the indicating liquid and pressure medium adjacent the upper end of at least one of the arms so as to prevent the forcing of the indicating liquid out of the instrument. Also both arms of the present manometer have the same bore, and are placed side by side, so that pressures may be read direct from the differences in the heights of the liquid columns.

Since this invention is particularly adapted for use with gas analysis apparatus, its use with such apparatus will be illustrated in the accompanying drawing.

In the drawing—

The figure shows a manometer constructed in accordance with this invention and having its arms operatively connected to a gas burette and compensator tube of a gas analysis apparatus.

Referring more particularly to the drawing, the manometer consists of a tube bent to form a U-tube having substantially parallel arms 2 and 3.

The arm 2 has its open upper end connected through a tube 4 and valve 5 to the upper end of a gas burette 6 of a standard gas analysis apparatus.

The arm 3 is reversely bent at its upper end and connected to the compensator tube 7 of a gas analysis apparatus. The arm 3 is provided at the point of its reverse bend with a bleed branch 8 provided with a valve 9 so as to permit the arm 3 to be opened to the atmosphere when desired.

The gas burette and compensating tube are both enclosed in a water-jacket 9ª which is kept full of water to keep the temperature constant.

The lower end of the arm 2 has its bore enlarged to form a bulb or reservoir chamber 10, and a quantity of mercury or other indicating liquid 11 sufficient to fill the chamber 10 and extend slightly upwardly into the arms 2 and 3 is provided in the tube.

The arm 3 has its bore enlarged adjacent its upper end to provide a trap bulb 12 which is provided with a plurality of projections contracted intermediate its ends to form supports 13 adapted to support a substantially conical float valve 14. The trap bulb 12 is provided with an outlet port or opening having a seat 15, and the float valve 14 is of such size that its upper end remains within said outlet opening when said valve is in open position so as to guide said valve into seating position.

If for any reason the indicating liquid 11 is forced up in the arm 3 of the tube, such as when the pressure in the arm 2 is excessive, the liquid will enter the trap bulb 12 and float the valve 14 upwardly against the seat 15 formed on the upper end of the bulb 12 so as to prevent the indicating liquid and also any gas from passing out of the arm 3. The volume of the bulb 12, of course, will be understood to be less than that necessary to contain all the indicating liquid in the tubes so that the valve will be forced to seat.

If for any reason it is desired to guard against the escape of the indicating liquid from the arm 2, it will be understood that a second trap and valve may be placed adjacent the upper end of the arm 2.

In operation, assuming that the manometer is being used in connection with a gas analysis apparatus, as shown in the drawing, at the beginning of an analysis, valve 9 is usually opened to the air, thus permitting the gas enclosed in the compensating tube 7 to come to atmospheric pressure. Then a sufficient quantity of the gas to be analyzed is drawn into the measuring burette 6, and the valve 5 is turned as shown in the drawing to connect the burette with the manometer. The pressure on the gas in the burette is adjusted by means of a leveling bottle until the tops of the columns of the indicating liquid in the arms 2 and 3 of the apparatus are on the same level and the volume of gas is read from the graduations on the burette (not shown); or, the pressure on the gas in the burette is adjusted until the volume equals a certain quantity, and the position of the top of one of the columns of liquid in the manometer is indicated at A in the drawing. In either case all succeeding volumes during the analysis are determined in the same way.

Besides this use, the manometer of the present invention may be employed for other purposes, such as to measure the pressure of enclosed bodies of gases, to compare the pressures of two or more bodies of gases, or to measure the pressure necessary to force a body or bodies of gases into a fixed or constant volume, and for all purposes for which a manometer of the U-type may be desirable.

In all operations the reservoir chamber 10 serves to provide a collected or unseparated body of indicating liquid, and the trap chamber or bulb 12 and valve 14 serve to prevent the escape of the indicating liquid and gases being measured.

I claim—

A manometer comprising a one-piece glass U-tube, the arms of which are parallel and have a bore throughout the major portion of their length of capillary size, one of said arms being adapted to be connected to the supply of the pressure medium, and said arm being provided at its lower end with an enlargement forming a reservoir chamber for the indicating fluid, the other of said arms being provided with a bulb-like enlargement adjacent its upper end forming a trap for trapping the indicating liquid when said liquid is forced upwardly to said bulb by an overpressure, a substantially conical shaped float valve in said trap, said valve having its apex directed upwardly so that when the valve is floated upwardly it will be seated against the outlet of said trap to prevent the flow of said indicating liquid and pressure medium upwardly beyond said trap, said valve being of such size that its upper end remains within said outlet opening of said trap when said valve is in open position so as to guide said valve into seating position, and means for preventing said valve from seating against the inlet of said trap when said overpressure of the pressure medium is relieved, whereby said liquid is permitted to flow back into said second named arm.

In testimony whereof, I have hereunto signed my name.

CHARLES B. FRANCIS.